United States Patent
Kirkland et al.

(10) Patent No.: US 10,874,965 B2
(45) Date of Patent: Dec. 29, 2020

(54) OFF-GAS CONDITIONING SYSTEM AND METHOD

(71) Applicant: FECC, INC., Orlando, FL (US)

(72) Inventors: Gordon Kirkland, Orlando, FL (US); Elgin Kirkland, Satellite Beach, FL (US); Phil Lamori, Los Angeles, CA (US); Don Clift, Merritt Island, FL (US); Victor San Agustin, Orlando, FL (US)

(73) Assignee: Geo-Solutions, Inc., New Kensington, PA (US)

( * ) Notice: Subject to any disclaimer, the term of this patent is extended or adjusted under 35 U.S.C. 154(b) by 0 days.

(21) Appl. No.: 15/842,365

(22) Filed: Dec. 14, 2017

(65) Prior Publication Data

US 2019/0184320 A1    Jun. 20, 2019

(51) Int. Cl.
*B01D 45/02* (2006.01)
*B09C 1/06* (2006.01)
(Continued)

(52) U.S. Cl.
CPC ......... *B01D 45/02* (2013.01); *B01D 46/0027* (2013.01); *B01D 46/4263* (2013.01); *B01D 50/002* (2013.01); *B01D 53/002* (2013.01); *B01D 53/265* (2013.01); *B09C 1/06* (2013.01); *G01N 1/2205* (2013.01); *G01N 1/2226* (2013.01); *B01D 2253/102* (2013.01); *E21B 7/027* (2013.01); *G01N 2001/2267* (2013.01); *G01N 2001/2282* (2013.01)

(58) Field of Classification Search
CPC .. B01D 45/02; B01D 46/0027; B01D 50/002; B01D 46/4263; B01D 53/265; B01D 53/002; B09C 1/06; G01N 1/2226; G01N 1/2205; G01N 2001/2267; G01N 2002/2282; E21B 7/027
USPC ...... 55/385.1, DIG. 34; 73/863.23; 173/185; 175/135; 166/267, 268, 306; 405/128.65, 128, 131, 258; 47/58.1
See application file for complete search history.

(56) References Cited

U.S. PATENT DOCUMENTS 5,010,776 A * 4/1991 Lucero ............... B09B 1/00
                                                73/863.23
5,011,329 A * 4/1991 Nelson ............... B09C 1/06
                                                405/128.65

(Continued)

*Primary Examiner* — Minh Chau T Pham
(74) *Attorney, Agent, or Firm* — Lowndes; Jon M. Gibbs

(57) ABSTRACT

An off-gas conditioning system includes a source of off-gas, at least one testing port, in communication with the source of off-gas wherein the testing port is connected to a meter capable of testing at least one metric selected from the group consisting of temperature, pressure, flow rate, and humidity. A first vapor-liquid separator in communication with and downstream of the source of off-gas, a second vapor liquid separator in communication with and downstream of the first vapor liquid separator, wherein at least one of the first or second vapor-liquid separators includes a heat-exchanger for cooling the off-gas, and wherein at least one of said first or second vapor liquid separators includes a particulate filter for removing particulates from the off-gas. at least one testing port, downstream of the second vapor-liquid separator in communication with at least one analyzer for analyzing said off-gas for specific chemical compounds.

20 Claims, 7 Drawing Sheets

(51) Int. Cl.
  *B01D 53/00* (2006.01)
  *B01D 53/26* (2006.01)
  *B01D 46/42* (2006.01)
  *B01D 50/00* (2006.01)
  *G01N 1/22* (2006.01)
  *B01D 46/00* (2006.01)
  *E21B 7/02* (2006.01)

(56) References Cited

U.S. PATENT DOCUMENTS

| | | | | |
|---|---|---|---|---|
| 5,213,169 | A * | 5/1993 | Heller | E21B 4/20 |
| | | | | 173/185 |
| 5,286,140 | A * | 2/1994 | Mather | B09C 1/10 |
| | | | | 210/610 |
| 5,435,399 | A * | 7/1995 | Peterson | E02D 1/04 |
| | | | | 175/135 |
| 5,441,365 | A * | 8/1995 | Duffney | B01D 53/00 |
| | | | | 166/267 |
| 5,482,402 | A * | 1/1996 | Nelson | B09C 1/06 |
| | | | | 405/128.65 |
| 5,709,505 | A * | 1/1998 | Williams | B09C 1/005 |
| | | | | 166/268 |
| 2006/0112627 | A1* | 6/2006 | Geisel | B09C 1/00 |
| | | | | 47/58.1 SC |
| 2017/0291202 | A1* | 10/2017 | Council, III | B09C 1/005 |

* cited by examiner

OFF-GAS CONDITIONING SYSTEM AND METHOD

FIELD OF INVENTION

The present disclosure generally relates to the conditioning of off-gas during the remediation of soil; more specifically, to the conditioning of off-gas with in situ real-time testing.

BACKGROUND OF THE INVENTION

FECC, Inc.'s (FECC) remediation of soil and groundwater using thermal remediation with large diameter auger (LDA) drilling equipment has resulted in the removal of 99% to 99.9% of chlorinated volatile organic compounds (VOCs). Typically, thermal remediation technology alone has removal efficiencies of 90 to 99% for VOCs. FECC uses an LDA along with high pressure steam and hot air to thermally treat such contaminated areas. Soil, groundwater, and VOC contaminants are actively mixed during drilling thus increasing permeability and contact surface area of the contaminated media with the steam and hot air. The active mixing permits both soil and groundwater to be treated evenly and promotes maximum heat transfer from the steam and hot air to the contaminated media.

Steam and hot air are injected from ports on the LDA as it rotates and heat up and volatilize the contaminant VOCs. The volatilized contaminants are removed and conveyed to the surface via steam supplied through an annulus in a rotating Kelly bar at the center of the LDA. These gaseous contaminants rise to the surface and are collected in a shroud located on the surface immediately above the LDA and are transported via flexible ducts for treatment before the cleaned air is released into the atmosphere.

Combining the thermal remediation described above with another technology that can be injected and mixed into the soil, and which continues to remediate the soil after removal of the LDA drilling equipment improves removal efficiency and reduces cost when compared to thermal treatment alone. Use of ZVI in combination with thermal treatment has been shown to be effective for remediation of chlorinated VOC's. This combined approach takes advantage of the strengths of both thermal treatment and reductive dechlorination using ZVI. For thermal treatment with LDA soil mixing, the removal of large amounts of contamination occurs effectively and quickly. Use of the ZVI in-situ after thermal treatment promotes and enhances degradation of chlorinated VOCs without continued equipment expenses. Post treatment lab analyses of the soil and groundwater show that in most cases, contaminant data were either below Quantification Limits or below soil and groundwater cleanup target levels.

Soil remediation and treatment can be costly. Testing of soil and off-gas samples generally requires a cessation of operations, pulling samples for analysis, and awaiting the results before proceeding to another drill site or continuing until the samples taken are sufficiently clean to proceed to another drill site. The invention disclosed herein provides for an integrated remediation system which allows for real time monitoring and testing thus providing for a more efficient process.

BRIEF SUMMARY OF THE INVENTION

In accordance with the teachings disclosed herein, embodiments related to an off-gas conditioning system are disclosed.

An off-gas conditioning method and apparatus includes a source of off-gas, at least one testing port, in communication with the source of off-gas wherein the testing port is connected to a meter capable of testing at least one metric selected from the group consisting of temperature, pressure, flow rate, and humidity. A first vapor-liquid separator in communication with and downstream of the source of off-gas, a second vapor liquid separator in communication with and downstream of the first vapor liquid separator, wherein at least one of the first or second vapor-liquid separators includes a heat-exchanger for cooling the off-gas, and wherein at least one of said first or second vapor liquid separators includes a particulate filter for removing particulates from the off-gas at least one testing port, downstream of the second vapor-liquid separator in communication with at least one analyzer for analyzing said off-gas for specific chemical compounds.

The method and apparatus can include an analyzer selected from the group consisting of a gas chromatograph, a flame ionization detector, a photo ionization detector, a photoacoustic analyzer, a tunable diode laser spectrometer, an infrared analyzer, an ultraviolet analyzer, and a mass spectrometer.

The method and apparatus can include a heated connection between the analyzer and the testing port.

The method and apparatus can include at least one measured metric transmitted to a data acquisition system for monitoring, recording and/or analysis.

The method and apparatus can include a third vapor-liquid separator downstream from the second vapor liquid separator and upstream from the testing port in communication with the analyzer.

The method and apparatus can include a plurality of analyzers, wherein each of the analyzers is an analyzer selected from the group consisting of a gas chromatograph, a flame ionization detector, a photo ionization detector, a photoacoustic analyzer, a tunable diode laser spectrometer, an infrared analyzer, an ultraviolet analyzer, and a mass spectrometer.

The method and apparatus can include the off-gas being analyzed for chemical constituents.

The method and apparatus can include off-gas being analyzed for chemical constituents in real-time.

The method and apparatus can include at least one redundant testing port for redundantly measuring a metric.

The method and apparatus can include a disposal system for any collected condensate from the vapor-liquid separators.

The method and apparatus can include the off-gas being treated to remove chemical constituents before being discharged into the atmosphere.

DETAILED DISCLOSURE OF THE INVENTION

Figure 1:
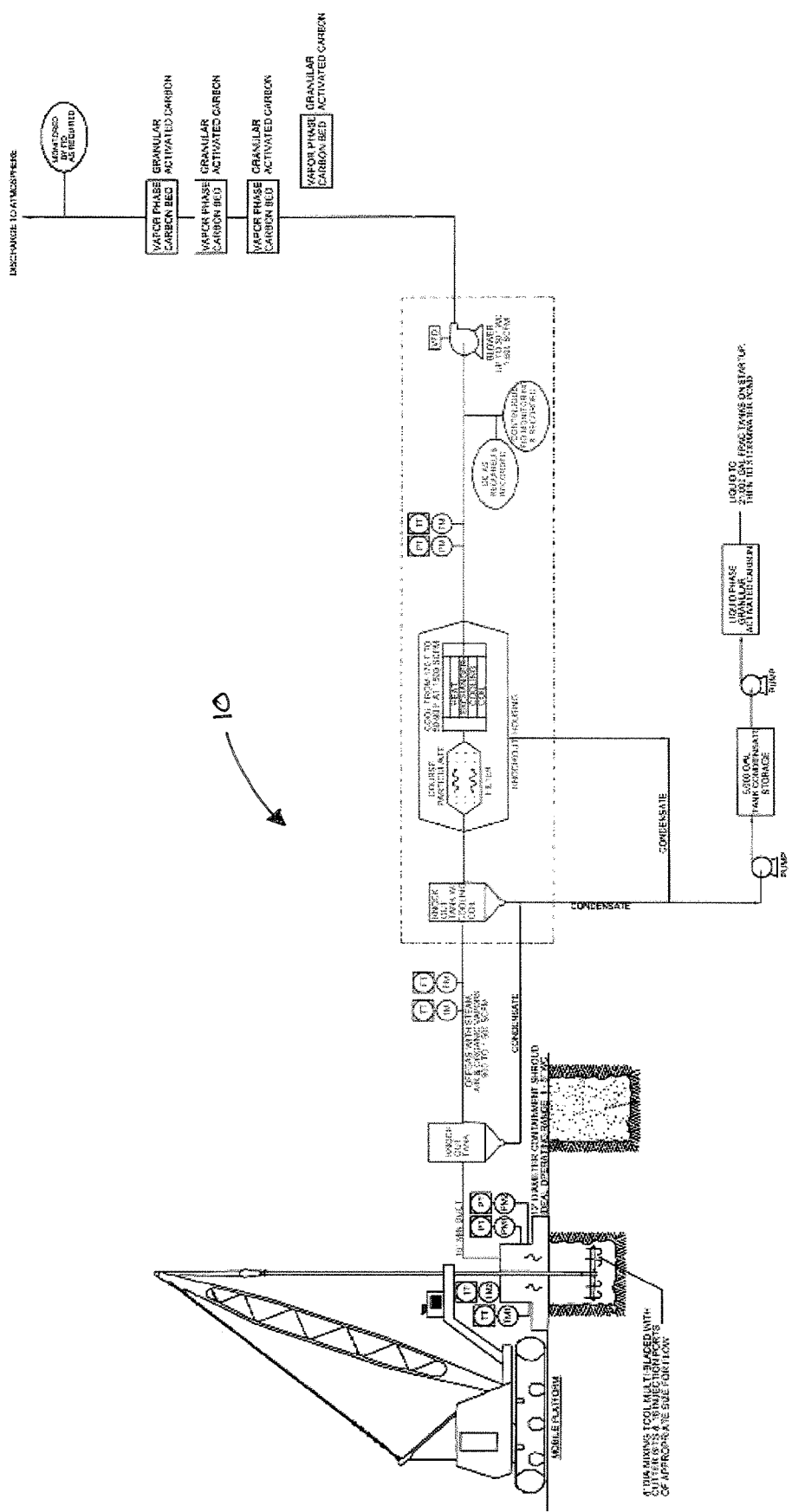
FIG. 1 is a flow-chart schematic showing an off-gas conditioning system according to aspects of the invention.

Referring now to FIG. 1, the off-gas conditioning system is disclosed herein and is shown and generally referred to by the reference numeral 10.

Figure 2:
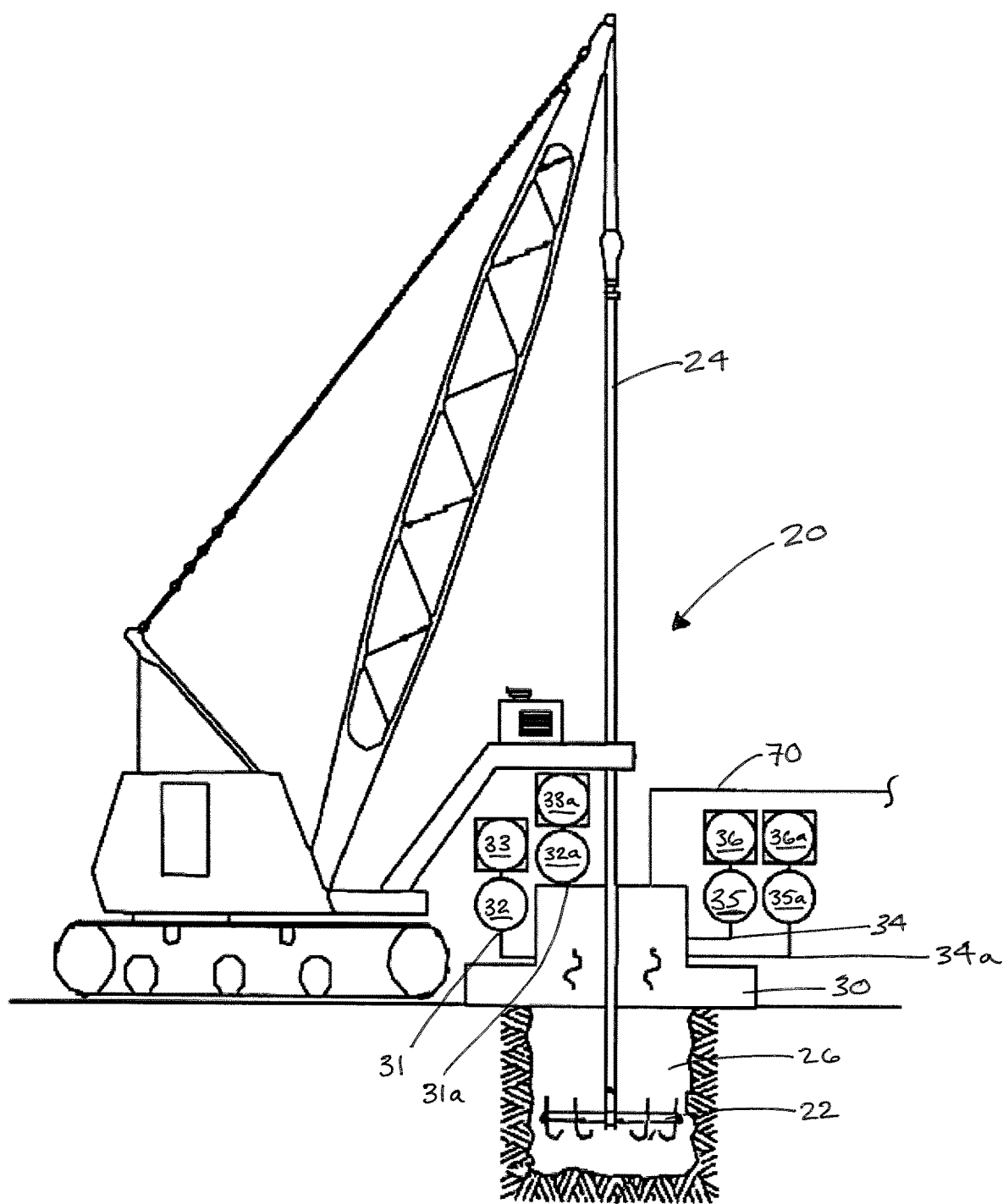
FIG. 2 is a partial flow-chart schematic showing the drilling assembly and source of off-gas of an off-gas conditioning system according to aspects of the invention.

Referring next to FIG. 2, according to aspects of the present invention, the off-gas conditioning system includes a source of off-gas 20 which is generally fed under positive pressure or drawn from the source 20 under negative pressure. The source 20 generally comprises a large diameter auger ("LDA") 22 driven by a large Kelly bar 24 attached to a steam source (not shown) wherein steam is introduced into the substrate, for example, soil, to steam-off contaminants contained in the substrate. As the LDA 22 progresses down into and through the substrate, it creates a column 26 through which contaminant-laden steam or "off-gas" rises to the surface. The emissions can be confined within a shroud 30, such as, for example, a 12-foot diameter containment shroud 30. A heavy shroud 30 can be used to prevent the emissions from leaking out of the bottom circumference of the shroud 30 and into the outdoor atmosphere. By way of example, a shroud 30 weighing approximately 12,000 lbs is shown. The shroud 30 can also be maintained under negative pressure to further prevent the off-gas from escaping outside of the shroud 30 into the outdoor air. According to aspect of the present invention, a negative pressure of exceeding 15 inches of water column ("WC") can be utilized with a preferred range of between about 1 to 5 inches WC.

In communication with the shroud 30, can be a first testing port 31 having a first thermometer 32 from which a first temperature measurement may be made. As used herein the term testing port can be any duct, tube, aperture or stub which may be connected to a testing device for chemical or environmental analysis. Testing ports can comprise stainless steel tubing further comprising a water trap to capture any moisture that may still be present just before the sample gas enters an analyzer or other measuring device.

The first temperature measurement can be sent to a data acquisition system (not shown) via a first temperature transmitter 33 for recording and/or analysis in real time. The first temperature transmitter 33 may be integrated with the first thermometer 32 or a separate apparatus. The first temperature transmitter 33 may be in communication with the data acquisition system (not shown) via a wired or wireless connection (not shown) as is known in the art.

Also in communication with the shroud 30, can be a second testing port 34 having a first pressure meter 35 from which a first pressure measurement may be made. The first pressure measurement can be sent to a data acquisition system (not shown) via a first pressure transmitter 36 for recording and/or analysis in real time. The first pressure transmitter 36 may be integrated with the first pressure meter 35 or a separate apparatus. The first pressure transmitter 36 may be in communication with the data acquisition system (not shown) via a wired or wireless connection (not shown) as is known in the art.

Due to the harsh environment inside the shroud 30, redundant system components may be desired. According to aspects of the present invention, the shroud 30, can include a first redundant testing port 31a having a first redundant thermometer 32a from which a first redundant temperature measurement may be made. The first redundant temperature measurement can be sent to a data acquisition system (not shown) via a first redundant temperature transmitter 33a for recording and/or analysis in real time. The first temperature transmitter 33a can be integrated with the first redundant thermometer 32a or a separate apparatus. The first redundant temperature transmitter 33a can be in communication with the data acquisition system (not shown) via a wired or wireless connection (not shown) as is known in the art.

Also in communication with the shroud 30, can be a second redundant testing port 34a having a first redundant pressure meter 34a from which a first redundant pressure measurement may be made. The first redundant pressure measurement can be sent to a data acquisition system (not shown) via a first redundant pressure transmitter 35a for recording and/or analysis in real time. The first redundant pressure transmitter 36a may be integrated with the first redundant pressure meter 35a or a separate apparatus. The first redundant pressure transmitter 36a may be in communication with the data acquisition system (not shown) via a wired or wireless connection (not shown) as is known in the art.

The temperature and pressure measurements in the shroud ensure that sufficient temperatures are achieved in the shroud, and that the correct vacuum inside the shroud is maintained to prevent any escape of the off-gas. While temperature and pressure measurements are described herein, flow rate and humidity may also be tested in addition to, or in lieu of, one or more of the temperature and/or pressure measurements.

The shroud 30 can include a shroud outlet duct 70, through which the off-gas passes for further treatment. By way of example, the duct 70 described herein can comprise metallic or polymeric materials and can be temperature and chemical resistant to prevent degradation caused by the characteristics of the off-gas. By way of example, a medium weight thermoplastic rubber hose reinforced with a spring steel wire helix and external polypropylene wear strip such as that manufactured under the trademark FLEXAUST® may be used. According to aspects of the present invention, a 10 inch FLEXAUST® can be used to draw off-gas from the shroud 30.

Figure 3:
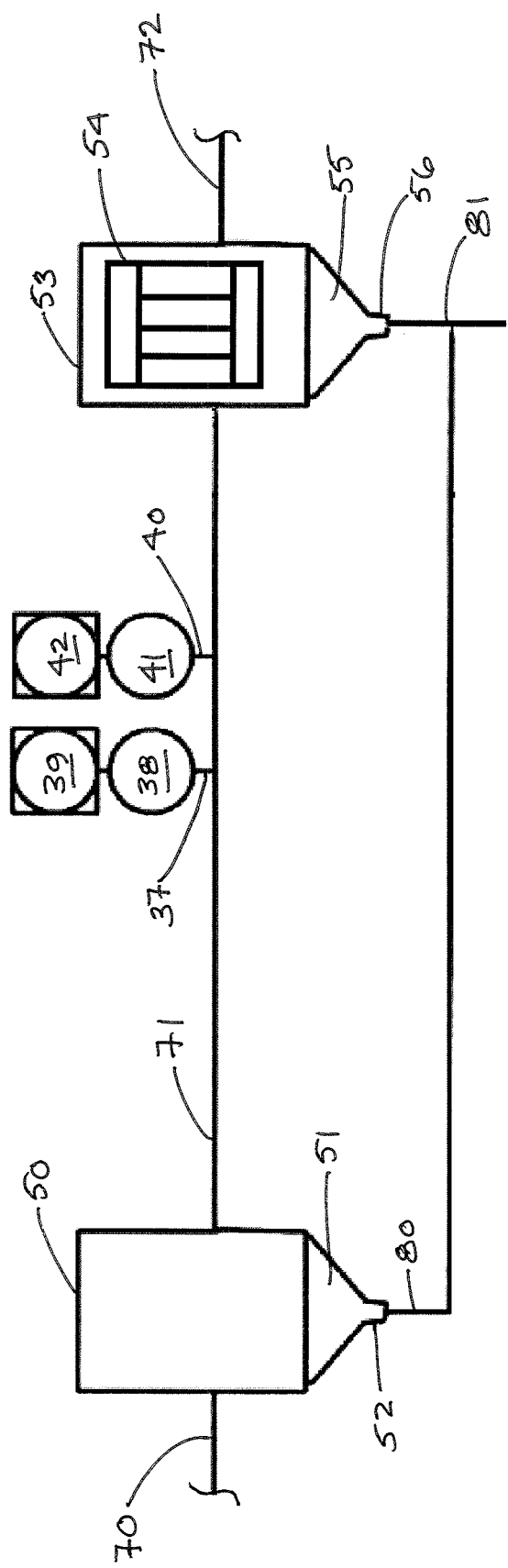
FIG. 3 is a partial flow-chart schematic showing two vapor-liquid separators and localized sample ports of an off-gas conditioning system according to aspects of the invention.

Turning next to FIG. 3, the off-gas can be pulled under vacuum from the shroud 30 through the shroud outlet duct 70 and into a first vapor-liquid separator 50. The first vapor liquid separator 50 is a knock-out tank wherein particulates and moisture are initially removed. As used herein, the term vapor-liquid separator can include a knock-out tank, a phase separator, an air-water separator or any other tank or housing capable of removing moisture from a gas. By way of example, the knock-out tank described herein is approximately 600 gallons in size.

The first vapor-liquid separator 50 generally operates to remove and collect an initial amount of moisture from the off-gas by the change in temperature under which the off-gas is subjected from the shroud outlet duct 70 and the vapor-liquid separator 50. As the off-gas leaves the shroud outlet duct 70 and enters the vapor-liquid separator 50, the temperature of the off-gas generally decreases allowing a portion of the moisture in the off-gas to condense and fall to the bottom of the vapor-liquid separator 50 wherein it is collected in a first collection basin 51. In addition to moisture, particulates may also fall to the bottom of the vapor-liquid separator 50 wherein they can also be collected in the first collection basin 51. If needed, the vapor-liquid separator can include a filter (not shown) for filtering out particulates and/or a heat-exchanger (not shown) for providing additional cooling characteristics. The first collection basin 51 includes a first condensate discharge port 52 which can be connected to a condensate line 80 for further collection and discharge of the resulting condensate and collected particulates. The first condensate discharge port 52 can include a trap or valve (not shown) to regulate the flow of condensate from the first collection basin to the condensate line 80. As used herein the term valve includes a ball valve, a butterfly valve, a check valve, a gate valve, a knife valve, a safety valve, or any other valve capable of regulating the flow of condensate through a discharge port.

The remaining off-gas in the first vapor-liquid separator 50 can then be drawn under vacuum through a first vapor-liquid separator duct 71. In communication with the first vapor-liquid separator duct 71, can be a first testing port 37 having a second thermometer 38 from which a second temperature measurement may be made. The second temperature measurement can be sent to a data acquisition system (not shown) via a second temperature transmitter 39 for recording and/or analysis in real time. The second temperature transmitter 39 may be integrated with the second thermometer 38 or a separate apparatus. The second temperature transmitter 39 may be in communication with the data acquisition system (not shown) via a wired or wireless connection (not shown) as is known in the art.

Also in communication with the first vapor-liquid separator duct 71, can be a second testing port 40 having a first flow meter 41 from which a first flow measurement may be made. The first flow measurement can be sent to a data acquisition system (not shown) via a first flow transmitter 42 for recording and/or analysis in real time. The first flow transmitter 42 may be integrated with the first flow meter 41 or a separate apparatus. The first flow transmitter 42 may be in communication with the data acquisition system (not shown) via a wired or wireless connection (not shown) as is known in the art. The off-gas can be drawn through the system 10 at flow-rate in excess of 2,500 standard cubic feet per minute "SCFM". By way of example, the system disclosed herein has a flow-rate that operates in a range of about 800 to 1,500 SCFM. While temperature and flow rate measurements are described herein, pressure and humidity may also be tested in addition to, or in lieu of, one or more of the temperature and/or flow rate measurements.

The off-gas is then drawn from the first vapor-liquid separator 50 through the first vapor-liquid separator duct 71 to a second vapor-liquid separator 53. The second vapor liquid separator 53 can comprise a second knock-out tank wherein additional particulates and moisture are removed. According to aspects of the present invention, the second vapor-liquid separator 53 includes a heat-exchanger 54 and operates to remove and collect additional moisture from the off-gas by the change in temperature under which the off-gas is subjected inside the second vapor-liquid separator 53.

As the off-gas leaves the first vapor-liquid separator duct 71 and enters the second vapor-liquid separator 53, the temperature of the off-gas is decreased due to the presence of the heat-exchanger 54 inside the second vapor liquid separator 53 thereby allowing additional moisture in the off-gas to condense and fall to the bottom of the second vapor-liquid separator 50 wherein it is collected in a second collection basin 51. The heat-exchanger 54 can comprise chill-water to promote the condensation of a portion of the steam flowing into the second vapor-liquid separator 53 from the first vapor-liquid separator duct 71.

According to aspects of the present invention, the source of the chill-water can be a water chiller (not shown), such as, for example, a 70 ton or 80 ton chiller. The chiller can provide chill-water to the heat-exchanger 54 in the second vapor-liquid separator 53 as well as other parts of the conditioning system that may require chill-water. By way of example, the chill-water can be cooled to a temperature between 33 degrees Fahrenheit and 75 degrees Fahrenheit. In a preferred embodiment, the chill-water leaves the chiller (not shown) at a temperature of approximately 44 degrees Fahrenheit and is then passed through the heat-exchanger 54, discharged from the heat-exchanger 54 and re-chilled or used in other parts of the system 10 that may require chill-water.

In addition to moisture, particulates may also fall to the bottom of the second vapor-liquid separator 53 wherein they can also be collected in the second collection basin 55. If needed, the vapor-liquid separator can include a filter (not shown) for filtering out additional particulates and/or an additional heat-exchanger (not shown) for providing additional cooling characteristics. The second collection basin 55 includes a second condensate discharge port 56 which can be connected to a condensate line 81 for further collection and discharge of the resulting condensate and collected particulates. The second condensate discharge port 56 can include a trap or valve (not shown) to regulate the flow of condensate from the first collection basin to the condensate line 81. As used herein the term valve includes a ball valve, a butterfly valve, a check valve, a gate valve, a knife valve, a safety valve, or any other valve capable of regulating the flow of condensate through a discharge port.

Figure 4:
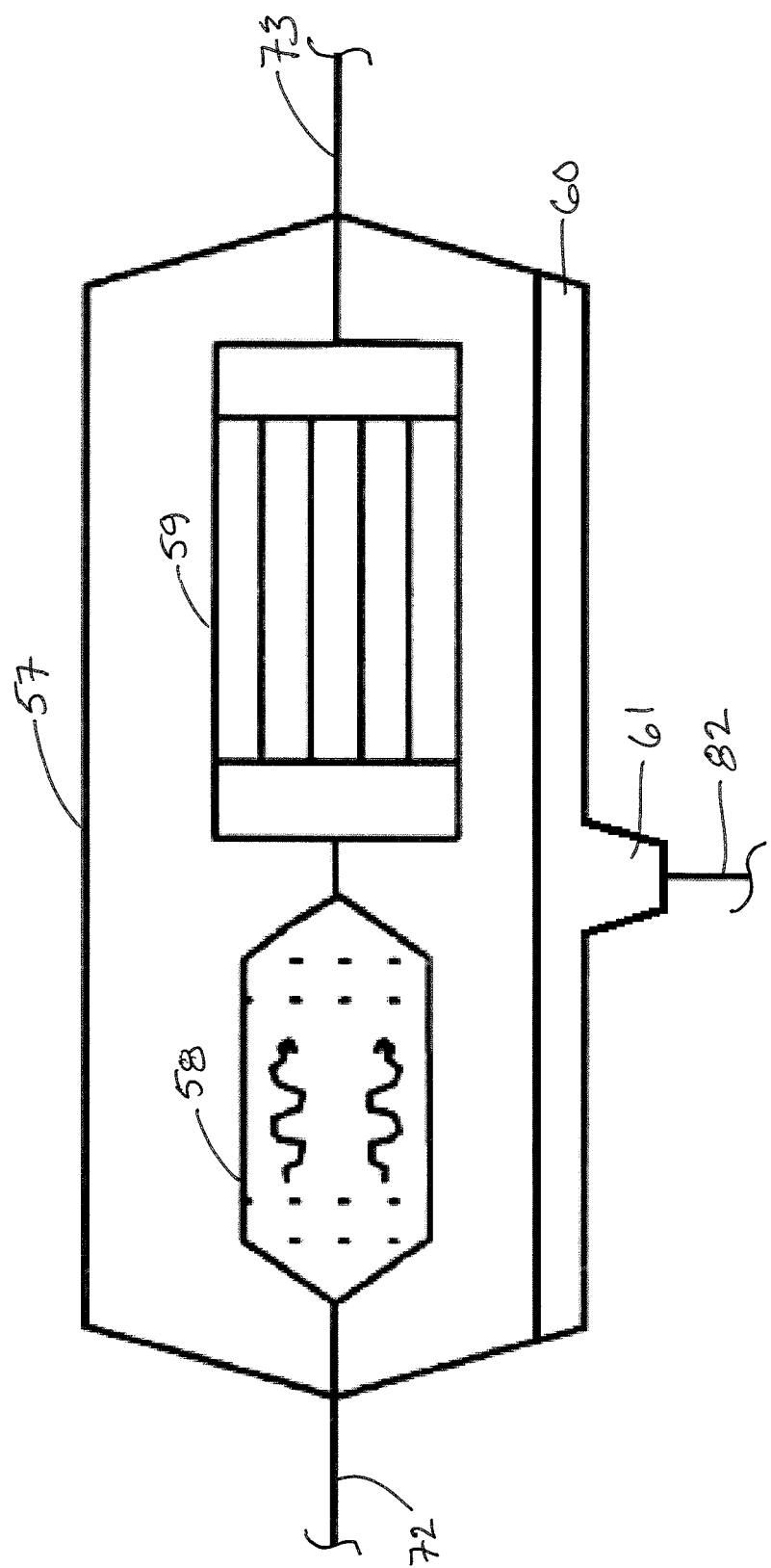
FIG. 4 is a partial flow-chart schematic showing a vapor-liquid separator housing of an off-gas conditioning system according to aspects of the invention.

Referring now to FIG. 4, the off-gas is then drawn from the second vapor-liquid separator 53 through the second vapor-liquid separator duct 72 to a third vapor-liquid separator 57. The third vapor liquid separator 57 can comprise a housing or a third knock-out tank wherein additional particulates and moisture are removed. According to aspects of the present invention, the third vapor-liquid separator 57 includes a filter 58 for filtering out particulates that could interfere with any testing apparatus attached to the system and a heat-exchanger 59. The third vapor-liquid separator 57 operates to remove and collect additional moisture from the off-gas by the change in temperature under which the off-gas is subjected inside the third vapor-liquid separator 57. As the off-gas leaves the second vapor-liquid separator duct 72 and enters the third vapor-liquid separator 57, the temperature of the off-gas is decreased due to the presence of the heat-exchanger 59 inside the third vapor liquid separator 57 thereby allowing additional moisture in the off-gas to condense and fall to the bottom of the second vapor-liquid separator 57 wherein it is collected in a second collection basin 60. In addition to moisture, particulates may also fall to the bottom of the second vapor-liquid separator 57 wherein they can also be collected in the third collection basin 60. If needed, the third vapor-liquid separator 57 can include an additional filter (not shown) for filtering out additional particulates and/or an additional heat-exchanger (not shown) for providing additional cooling characteristics. The third collection basin 60 includes a third condensate discharge port 61 which can be connected to a condensate line 82 for further collection and discharge of the resulting condensate and collected particulates. The third condensate discharge port 61 can include a trap or valve (not shown) to regulate the flow of condensate from the third collection basin 61 to the condensate line 82. As used herein the term valve includes a ball valve, a butterfly valve, a check valve, a gate valve, a knife valve, a safety valve, or any other valve capable of regulating the flow of condensate through a discharge port.

Figure 5:
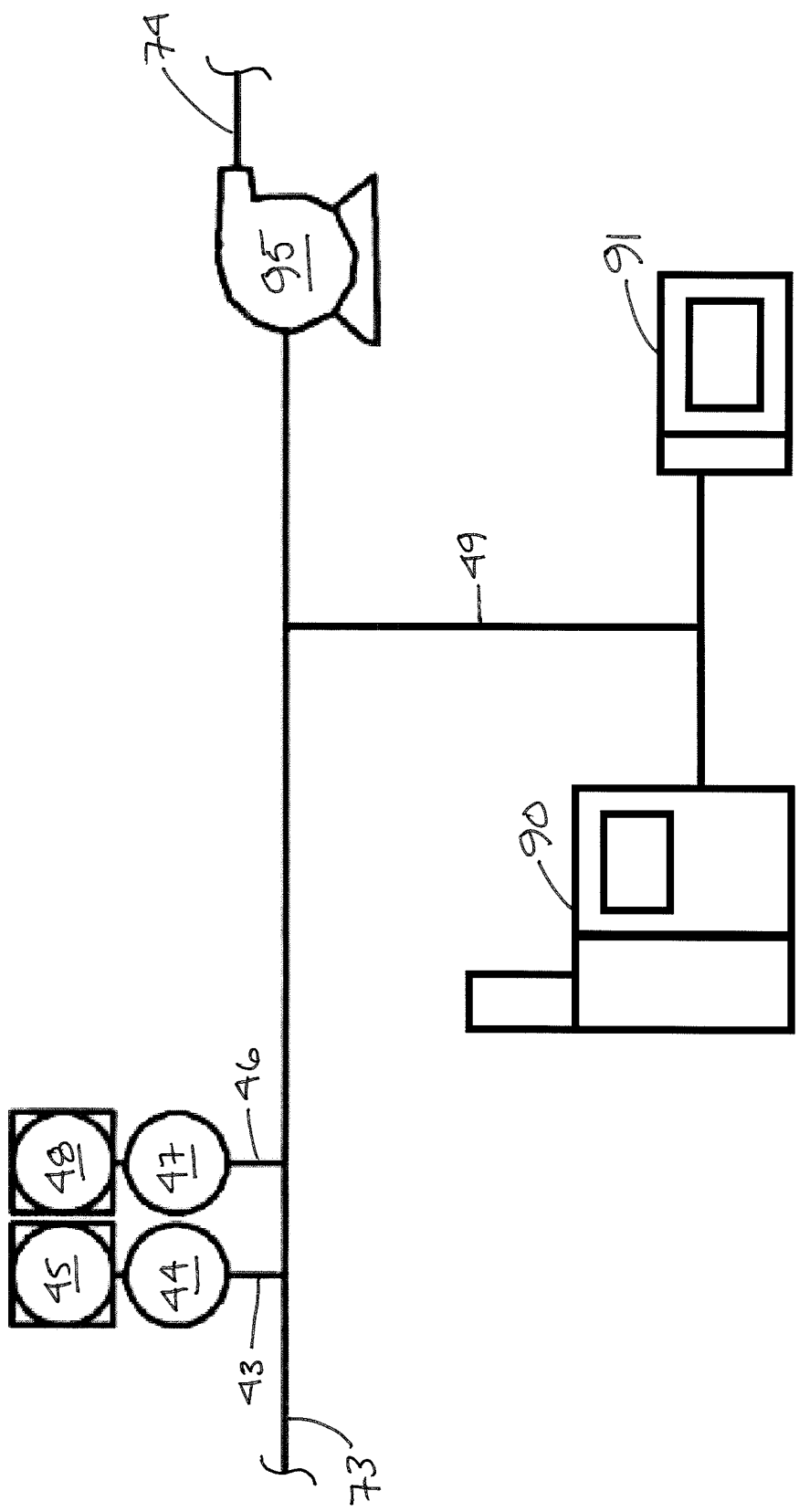
FIG. 5 is a partial flow-chart schematic showing additional sample ports, analyzers and blower of an off-gas conditioning system according to aspects of the invention.

Referring next to FIG. 5, the remaining off-gas in the third vapor-liquid separator 57 can then be drawn under vacuum from the third vapor-liquid separator 57 through a third vapor-liquid separator duct 73. In communication with the third vapor-liquid separator duct 73, can be a first testing port 43 having a second pressure meter 44 from which a second pressure measurement may be made. The second pressure measurement can be sent to a data acquisition system (not shown) via a second pressure transmitter 45 for recording and/or analysis in real time. The second pressure transmitter 45 may be integrated with the second pressure meter 44, or a separate apparatus. The second pressure transmitter 45 may be in communication with the data acquisition system (not shown) via a wired or wireless connection (not shown) as is known in the art.

Also in communication with the third vapor-liquid separator duct 73, can be a second testing port 46 having a third thermometer 47 from which a third temperature measurement may be made. The third temperature measurement can be sent to a data acquisition system (not shown) via a third temperature transmitter 48 for recording and/or analysis in real time. The third temperature transmitter 48 may be integrated with the third thermometer 47, or a separate apparatus. The third temperature transmitter 48 may be in communication with the data acquisition system (not shown) via a wired or wireless connection (not shown) as is known in the art. While pressure and temperature measurements are described herein, flow rate and humidity may also be tested in addition to, or in lieu of, one or more of the pressure and/or temperature measurements.

Also in communication with the third vapor-liquid separator duct 73, can be a third testing port 49 through which off-gas samples are taken and analyzed for constituent chemicals. In communication with the testing port 49 can be a first analyzer 90, and preferably a second analyzer 91 for off-gas testing. As used herein, the term analyzer can include a gas chromatograph, a flame ionization detector, a photoacoustic analyzer, tunable diode laser spectrometer, infrared analyzer, ultraviolet analyzer or any other analyzer capable of testing off-gas samples for constituent chemicals. According to aspects of the present invention, the analyzers 90, 91 may be in communication with the data acquisition system (not shown) via a wired or wireless connection (not shown) as is known in the art. In a preferred embodiment, the analyzers operate continuously to provide data in real time. Due to the limitations in testing turnaround times for certain analyzers, it may be desirable to operate a plurality of the same type of analyzer alternatively or in sequence to provide testing results with as little lag between results as possible.

According to aspects of the present invention, the testing port 49 leading to the analyzers 90, 91 may be heated to prevent any further condensing of the off-gas and introduction of undesired moisture into the analyzers 90, 91.

According to aspects of the present invention, at the end of the third vapor-liquid separator duct 73, opposite third vapor-liquid separator 57, can be a variable speed blower 95 pulling the off-gas through the system 10 via a connection with intake of the variable speed blower 95. Connected to the exhaust end of the variable speed blower 95 can be an exhaust duct 74 which transports the off-gas under positive pressure for further treatment and discharge. By way of example, a blower capable of producing a pressure or vacuum of up to and/or exceeding thirty (30) inches of WC can be used.

Figure 6:
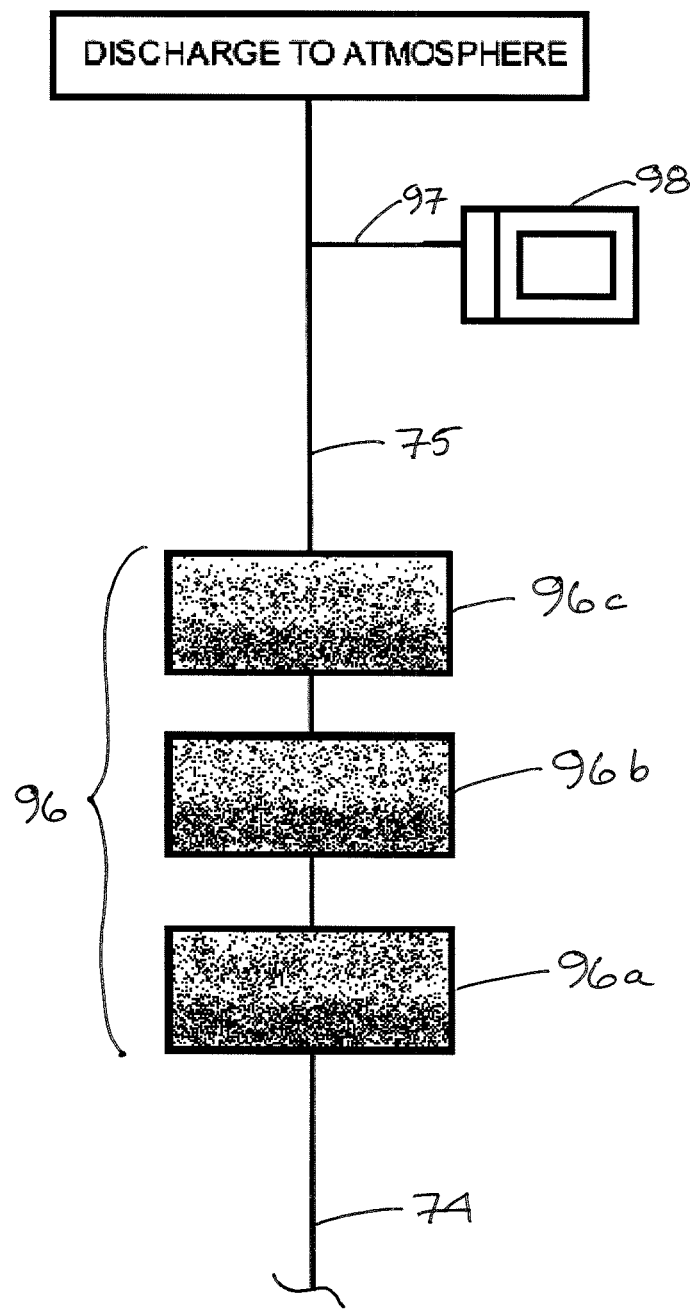
FIG. 6 is a partial flow-chart schematic showing the off-gas remediation discharge system of an off-gas conditioning system according to aspects of the invention.

Referring now to FIG. 6, by way of example, the off-gas may be treated prior to discharge by passing the off-gas through a contaminant remediation system 96. The term contaminant remediation system includes filtration systems, absorption systems, extraction systems, incinerating systems, combustion systems, oxidizing systems, reducing systems, chemical treatment system, or and any other system capable of removing contaminants from the conditioned off-gas. According to aspects of the present invention and by way of example, the contaminant remediation system described herein can include a vapor phase carbon adsorption system, comprising one or more carbon beds 96a, 96b, 96c. By way of example, the carbon beds 96a, 96b, 96c can comprise approximately 3,000 to 5,000 lbs of granular activated carbon to remediate the off-gas. After the off-gas is remediated, it can be sent through an exhaust duct 75 before being discharged from the system 10 into the atmosphere. If desired or necessary, the exhaust duct 75 can include a first testing port 97 for obtaining a sample of off-gas for analysis by one or more analyzers 98. Such analyzers can include gas chromatographs, flame ionization detectors, photo ionization detectors, photoacoustic analyzers, tunable diode laser spectrometers, infrared analyzers, ultraviolet analyzers, mass spectrometers, or any other analyzer capable of testing off-gas samples for constituent chemicals and/or confirm the remediation process. According to aspects of the present invention, the analyzer 98 can be in communication with the data acquisition system (not shown) via a wired or wireless connection (not shown) as is known in the art. After remediation of the off-gas is confirmed, the remaining off-gas in the exhaust duct 75 can be discharged into the atmosphere.

Figure 7:
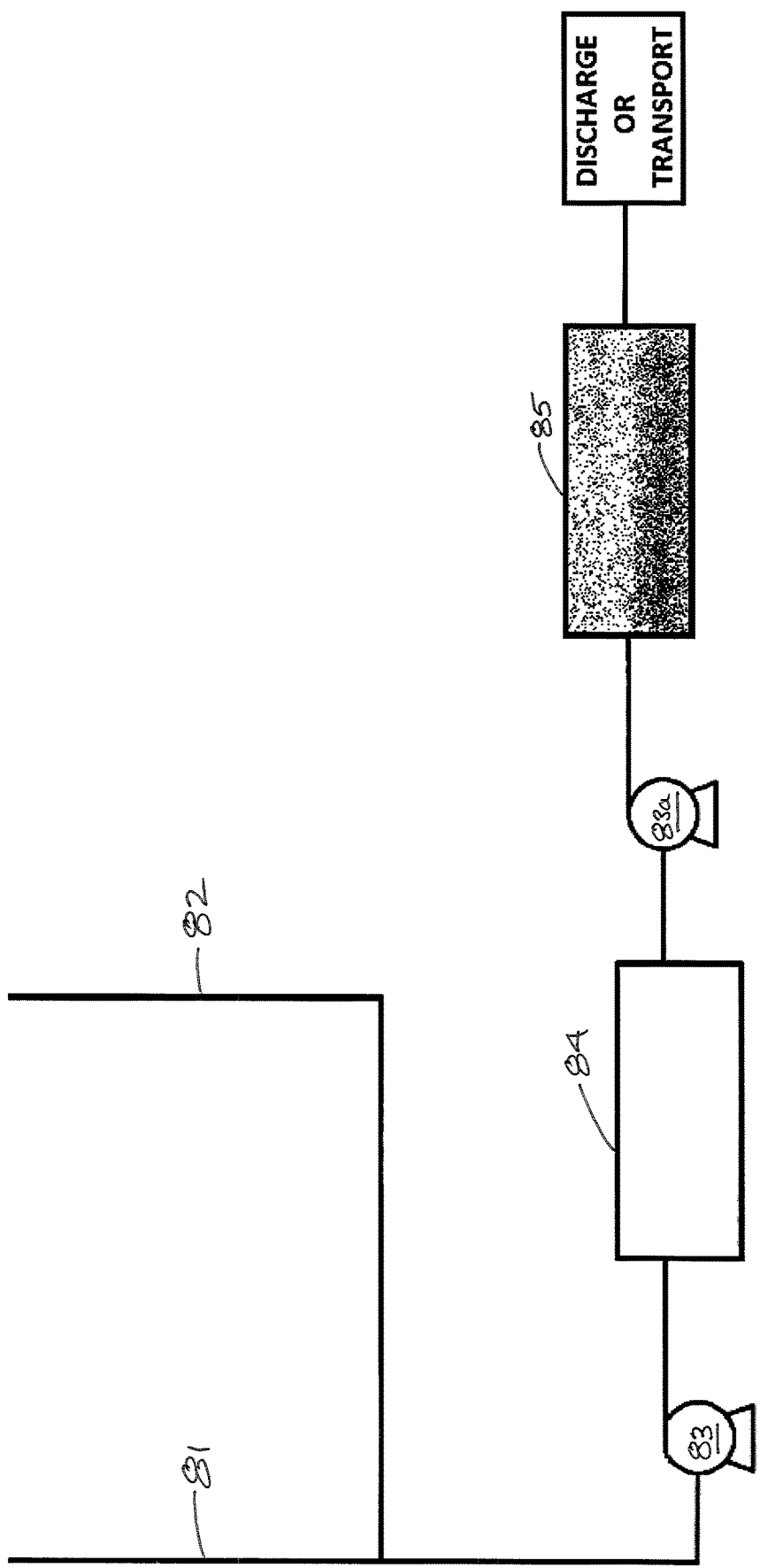
FIG. 7 is a partial flow-chart schematic showing the condensate remediation discharge system of an off-gas conditioning system according to aspects of the invention.

Referring now to FIGS. 3 and 7, the condensate discharge lines 80, 81, 82, used to collect the resulting condensate in the vapor-liquid separators 50, 53, 57, can be connected to one or more pumps 83 to transfer the condensate into one or more storage tanks 84 prior to treatment and discharge or transport. The condensate from the storage tanks 84 can be pumped through a pump 83a and passed through one or more filters and/or other treatment apparatus 85 to remove any remaining contaminants that may be present in the condensate. By way of example, collected condensate can be pumped into a treatment apparatus 85 containing liquid phase granular activated carbon ("GAC") to capture any organic contaminants that may be present in the condensate. After passing through the liquid phase GAC, the water is either discharged to a storm sewer system, a sanitary sewer system, or a water body under a valid EPA permit. The treated water may also be collected in tankers and transported offsite for proper disposal.

The data acquisition system (not shown) working in real time, analyzes the pressure, temperature and flow rate of the off-gas conditioning system to ensure optimal temperature, pressure and flow in the system 10. Any anomaly in the pressure, temperature or flow could be the result of improper system settings, faulty system components, or atmospheric leaks. Accordingly, anomalies in the data acquisition system can alert operators to the need for repair or adjustment of the system settings.

When used in combination with the analyzer results, the data acquisition system can alert the operators in real time whether the contaminants in the off-gas are at such a level as to indicate that the underlying substrate is at or below desired levels thus resulting in a more efficient drill.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

We claim:

1. An off-gas conditioning system comprising:
    a source of off-gas comprising an off-gas for testing;
    said source of off-gas in communication with a shroud for collecting said off-gas;
    at least one testing port, in communication with said shroud wherein said testing port is connected to a meter capable of testing at least one metric selected from the group consisting of temperature, pressure, flow rate, and humidity;
    a first vapor-liquid separator in communication with and downstream of said shroud;
    a second vapor liquid separator in communication with and downstream of said first vapor liquid separator, wherein at least one of said first or second vapor-liquid separators includes a heat-exchanger for cooling said off-gas, and wherein at least one of said first or second vapor liquid separators includes a particulate filter for removing particulates from said off-gas; and
    at least one testing port, downstream of the second vapor-liquid separator in communication with at least one analyzer for analyzing said off-gas for specific chemical compounds.

2. The apparatus of claim 1 wherein said at least one analyzer is an analyzer selected from the group consisting of a gas chromatograph, a flame ionization detector, a photo ionization detector, a photoacoustic analyzer, a tunable diode laser spectrometer, an infrared analyzer, an ultraviolet analyzer, and a mass spectrometer.

3. The apparatus of claim 2 further comprising a heated connection between the analyzer and the testing port.

4. The apparatus of claim 1 wherein any measured metric is transmitted to a data acquisition system for monitoring, recording and/or analysis.

5. The apparatus of claim 1 further comprising a third vapor-liquid separator downstream from said second vapor liquid separator and upstream from said testing port in communication with said analyzer.

6. The apparatus of claim 2 wherein said apparatus comprises a plurality of analyzers and wherein each of said plurality of analyzers is an analyzer selected from the group consisting of a gas chromatograph, a flame ionization detector, a photo ionization detector, a photoacoustic analyzer, a tunable diode laser spectrometer, an infrared analyzer, an ultraviolet analyzer, and a mass spectrometer.

7. The apparatus of claim 6 wherein the off-gas is analyzed for chemical constituents.

8. The apparatus of claim 6 wherein the off-gas is analyzed for chemical constituents in real-time.

9. The apparatus of claim 1 wherein said at least one testing port, in communication with said shroud comprises at least one redundant testing port for redundantly measuring a metric.

10. An off-gas conditioning system comprising:
    a source of off-gas comprising an off-gas for testing;
    said source of off-gas in communication with a shroud for collecting said off-gas;
    at least one testing port, in communication with said shroud wherein said testing port is connected to a meter capable of testing at least one metric selected from the group consisting of temperature, pressure, flow rate, and humidity;
    a first vapor-liquid separator in communication with and downstream of said shroud;
    a second vapor liquid separator in communication with and downstream of said first vapor liquid separator, wherein at least one of said first or second vapor-liquid separators includes a heat-exchanger for cooling said off-gas, and wherein at least one of said first or second vapor liquid separators includes a particulate filter for removing particulates from said off-gas;
    a third vapor-liquid separator downstream from said second vapor liquid separator; and
    at least one testing port, downstream of the third vapor-liquid separator in communication with at least one analyzer for analyzing said off-gas for specific chemical compounds.

11. The apparatus of claim 10 wherein said at least one analyzer is an analyzer selected from the group consisting of a gas chromatograph, a flame ionization detector, a photo ionization detector, a photoacoustic analyzer, a tunable diode laser spectrometer, an infrared analyzer, an ultraviolet analyzer, and a mass spectrometer.

12. The apparatus of claim 11 further comprising a heated connection between the analyzer and the testing port.

13. The apparatus of claim 10 wherein any measured metric is transmitted to a data acquisition system for monitoring, recording and/or analysis.

14. The apparatus of claim 10 wherein said apparatus comprises a plurality of analyzers and wherein each of said plurality of analyzers is an analyzer selected from the group consisting of a gas chromatograph, a flame ionization detector, a photo ionization detector, a photoacoustic analyzer, a tunable diode laser spectrometer, an infrared analyzer, an ultraviolet analyzer, and a mass spectrometer.

15. The apparatus of claim 14 wherein the off-gas is analyzed for chemical constituents.

16. The apparatus of claim 14 wherein the off-gas is analyzed for chemical constituents in real-time.

17. The apparatus of claim 14 wherein the off-gas is analyzed for chemical constituents in real-time by analyzers operating alternatively.

18. The apparatus of claim 10 further comprising a testing port between said first vapor liquid separator and said second vapor liquid separator wherein said testing port is connected to a meter capable of testing at least one metric selected from the group consisting of temperature, pressure, flow rate, and humidity.

19. The apparatus of claim 10 wherein said off-gas is treated to remove any constituent chemicals before being discharged into the atmosphere.

20. An off-gas conditioning system comprising:
    a source of off-gas comprising an off-gas for testing;
    said source of off-gas in communication with a shroud for collecting said off-gas;
    at least one testing port, in communication with said shroud wherein said testing port is connected to a meter capable of testing at least one metric selected from the group consisting of temperature, pressure, flow rate, and humidity;
    at least one redundant testing port, in communication with said shroud wherein said redundant testing port is connected to a meter capable of redundantly testing at least one metric selected from the group consisting of temperature, pressure, flow rate, and humidity;

a first vapor-liquid separator in communication with and downstream of said source of off-gas;

a testing port in communication with and downstream of said first vapor liquid separator wherein said testing port is connected to a meter capable of testing at least one metric selected from the group consisting of temperature, pressure, flow rate, and humidity;

a second vapor liquid separator downstream of said testing port, wherein said second vapor-liquid separator includes a heat-exchanger for cooling said off-gas;

a third vapor-liquid separator downstream from said second vapor liquid separator and wherein said third vapor liquid separator includes a particulate filter for removing particulates from said off-gas and a heat-exchanger for cooling said off-gas; and at least one testing port, downstream of the third vapor-liquid separator in communication with at least one analyzer for analyzing said off-gas for specific chemical compounds, wherein said at least one analyzer is an analyzer selected from the group consisting of a gas chromatograph, a flame ionization detector, a photo ionization detector, a photoacoustic analyzer, a tunable diode laser spectrometer, an infrared analyzer, an ultraviolet analyzer, and a mass spectrometer.

* * * * *